W. H. Gould,

Milk Cooler.

No. 106,811.  Patented Aug. 30, 1870.

Witnesses:
M. Vorlander
W. F. Clark

Inventor:
W. H. Gould
per Munn & Co.
Attorneys.

United States Patent Office.

WARREN H. GOULD, OF MANCHESTER, NEW HAMPSHIRE.

Letters Patent No. 106,811, dated August 30, 1870.

IMPROVEMENT IN MILK-COOLERS.

The Schedule referred to in these Letters Patent and making part of the same

*To all whom it may concern:*

Be it known that I, WARREN H. GOULD, of Manchester, in the county of Hillsborough and State of New Hampshire, have invented a new and improved Milk-Cooler; and I do hereby declare that the following is a full, clear, and exact description thereof, which will enable others skilled in the art to make and use the same, reference being had to the accompanying drawing forming part of this specification.

The object of this invention is to provide a simple and efficient milk-cooling apparatus, whereby the pans containing the milk or cream may be exposed to the action of cool running water.

Figure 1:
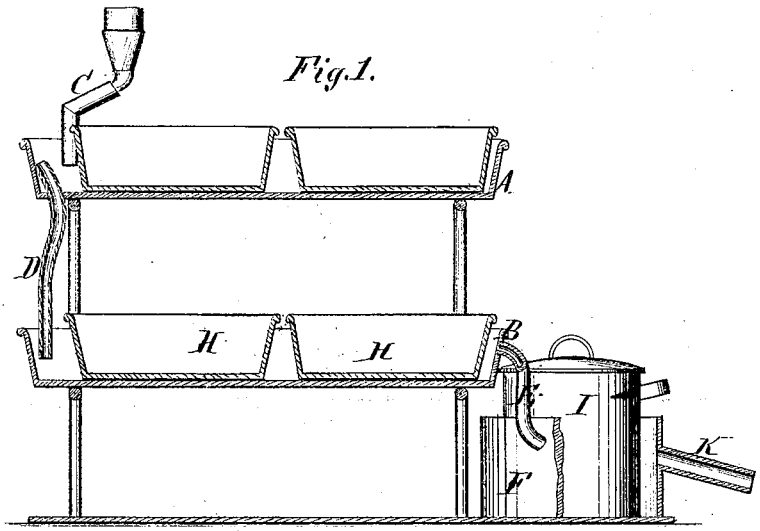
Figure 1 represents a longitudinal section of my improved apparatus.
Figure 2:
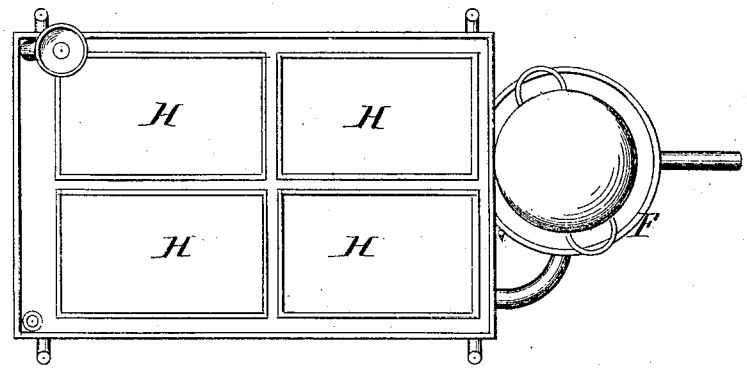
Figure 2 represents a plan view of the same.

A and B are water-vats, arranged on suitable supports, one above the other.

C is a water-spout, leading into the upper vat A, and

D is another spout, leading from the upper to the lower vat, the upper end rising above the bottom, so that all the water in the said vat will not run out.

E is an escape-pipe from the vat B, leading into a circular or other formed vat, F, for holding a cream-pot.

H are shallow, square milk-pans, placed in these vats, on studs, to keep their bottoms slightly above the bottoms of the vats, to cause a free circulation of the water under them.

I is a cream-pot, into which the cream is to be placed for keeping cool after being skimmed from the milk in the pans.

K is the final escape-pipe, leading from the vat F.

Having thus described my invention,

I claim as new and desire to secure by Letters Patent—

The arrangement of the vats A B F and pipes C, D, E, and K, operating as described, for the purpose specified.

WARREN H. GOULD.

Witnesses:
R. H. PIKE,
J. I. WHITTEMORE.